United States Patent [19]

Lee

[11] Patent Number: 4,999,756
[45] Date of Patent: Mar. 12, 1991

[54] DESK LAMP WITH ADJUSTABLE LIGHTS

[76] Inventor: Hsuan-Yu Lee, No. 18, Fun-Lin 1st. St., Sin-Hwa Chung, San-Chih Hsiang, Taipei Hsien, Taiwan

[21] Appl. No.: 529,606

[22] Filed: May 29, 1990

[51] Int. Cl.⁵ .............................................. F21V 21/14
[52] U.S. Cl. .................................... 362/250; 362/421; 362/287
[58] Field of Search ............... 362/250, 285, 287, 419, 362/421, 427, 429, 413, 414

[56] References Cited

U.S. PATENT DOCUMENTS 2,041,847  5/1936  Marchand ..................... 362/410 X
4,449,169  5/1984  Warshawsky ................. 362/414 X

*Primary Examiner*—Stephen F. Husar

[57] ABSTRACT

A desk lamp with adjustable lights mainly comprising a cone-shaped stationary base, a rotary head supporting member, a rotary head, a bow-shaped hollow arm and lamp housings; the rotary head is mounted on the top of the cone-shaped stationary base; the lamp housings are disposed at opposite ends of a bow-shaped hollow arm, which is attached to the rotary head; since the rotary head can rotate 360 degrees in horizontal direction, and pivot in the vertical direction with respect to the cone-shaped stationary base, the light of the lamp can be adjusted by a user; moreover, since the light of the lamp can be thrown first on the surface of the cone-shaped stationary base, and then is reflected to a desk surface, the light becomes much mild to a user than a direct light beam.

1 Claim, 4 Drawing Sheets

DESK LAMP WITH ADJUSTABLE LIGHTS

BACKGROUND OF THE INVENTION

Halogen desk lamps have become a new light source for offices and families because the wave length of light emitted by this type of lamps is more stable and offers better protection to human eyes. Most of the desk lamps available in the market, especially halogen desk lamps, mainly comprise a lamp tube, a lamp base and perpendicular supporting poles that vary only in shapes. This invention has a new structure to provide more functions than the conventional desk lamps. The reflection and diffusion of the light of the present invention make the projected light rays softer, and the direction of the light can be adjusted according to user's requirement. Since the bow-shaped hollow arm can be revolved 360 degrees horizontally and the lamp sockets can also be rotated 360 degrees, the direction of the lamp light can be changed freely at any angle desired.

SUMMARY OF THE INVENTION

The distinctive feature of this invention is to a cone-shaped stationary base (which has a lower center of gravity) as the main framework to support two lamp sockets connected by a bow-shape hollow arm (its hollow interior accommodates the wires) going through a rotary head installed on the top of the cone-shaped stationary base able to rotate 360 degrees. The cone-shaped stationary base is made of materials that reflect light rays appropriately, such as stainless steel plate, electroplated iron plate or copper plate; it can reflect a portion of the light source and can make the whole main framework become a softly lighted cylinder so as to obtain a softer and more even distribution of the light rays projected by the light source.

DETAILED DESCRIPTION OF THE PREFERRED EMBODIMENT

Figure 1:
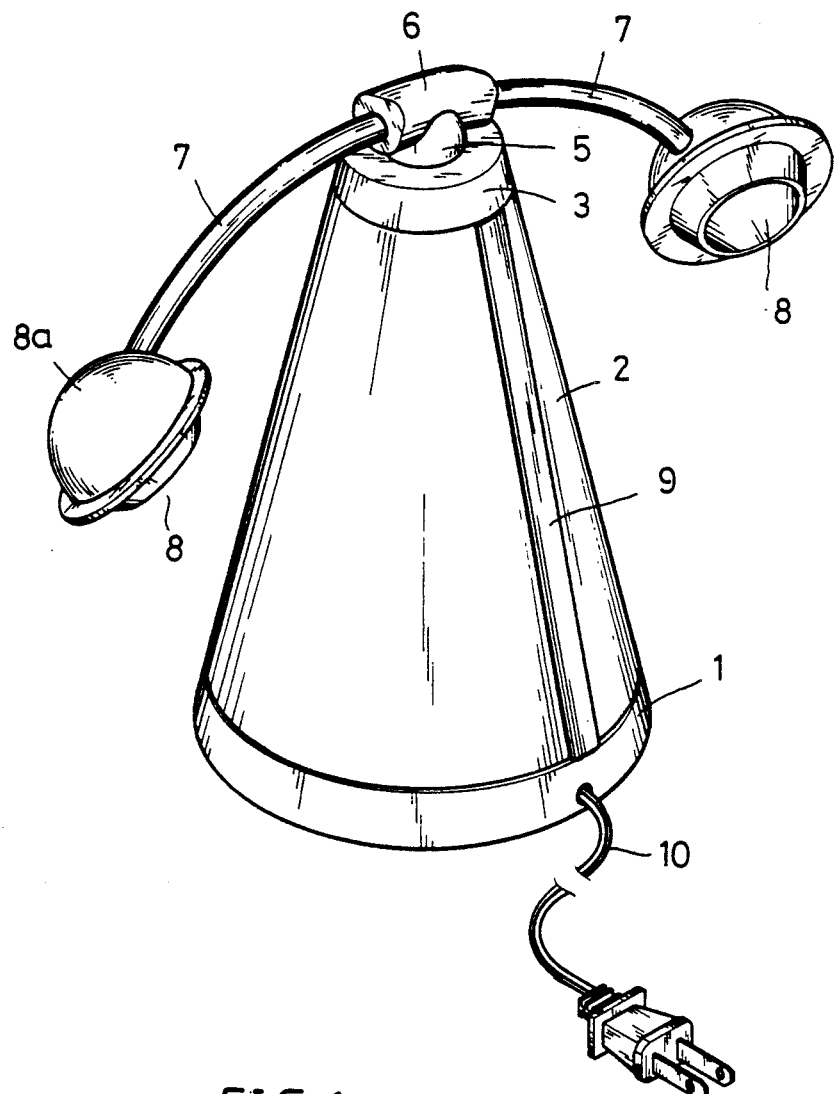
FIG. 1 is a perspective view of this invention.
Figure 2:
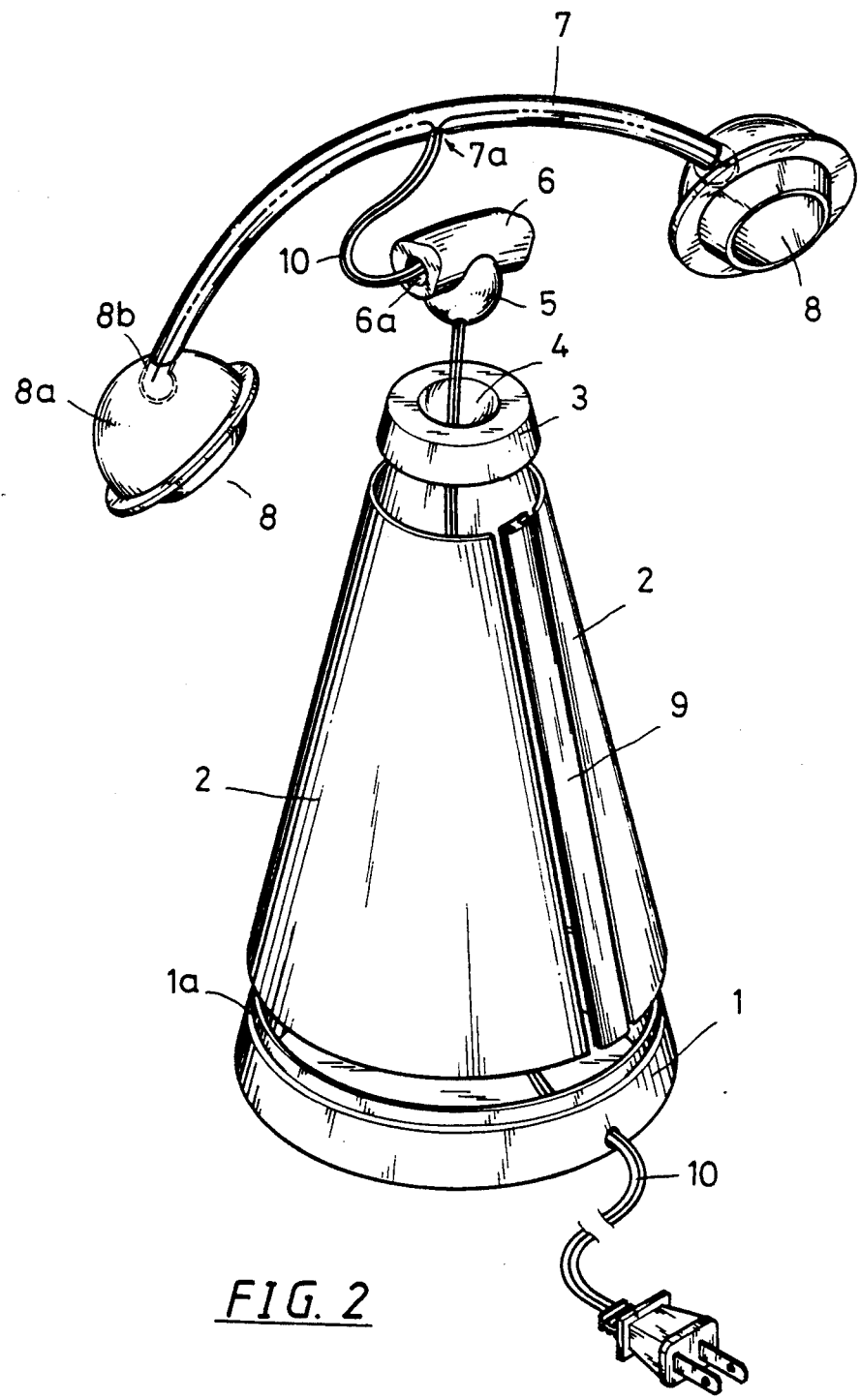
FIG. 2 shows the structure of this invention.
Figure 3:
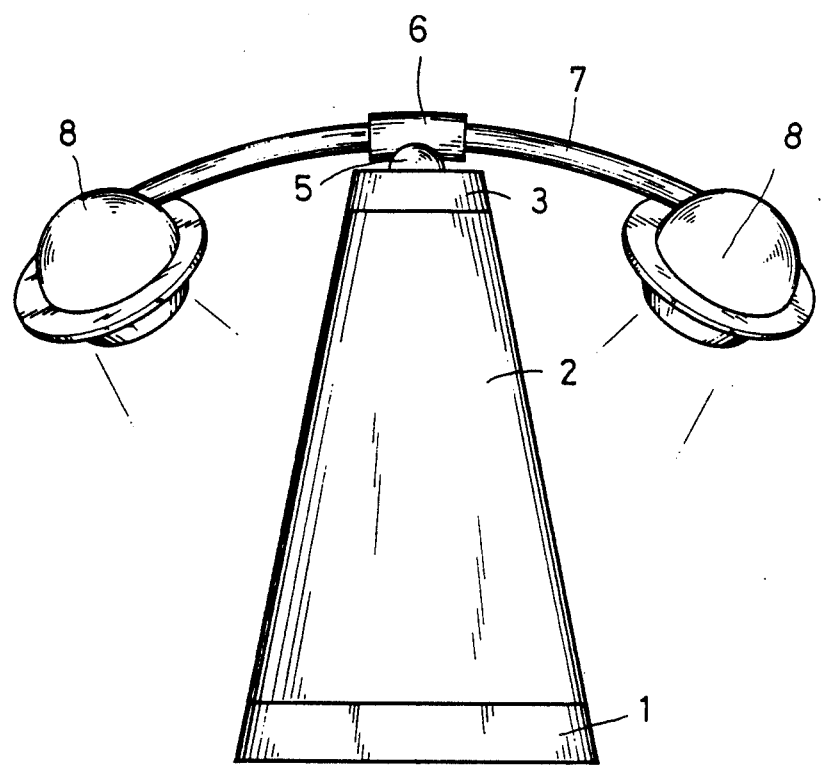
FIG. 3 illustrates the reflection of the light rays according to the present invention.
Figure 4:
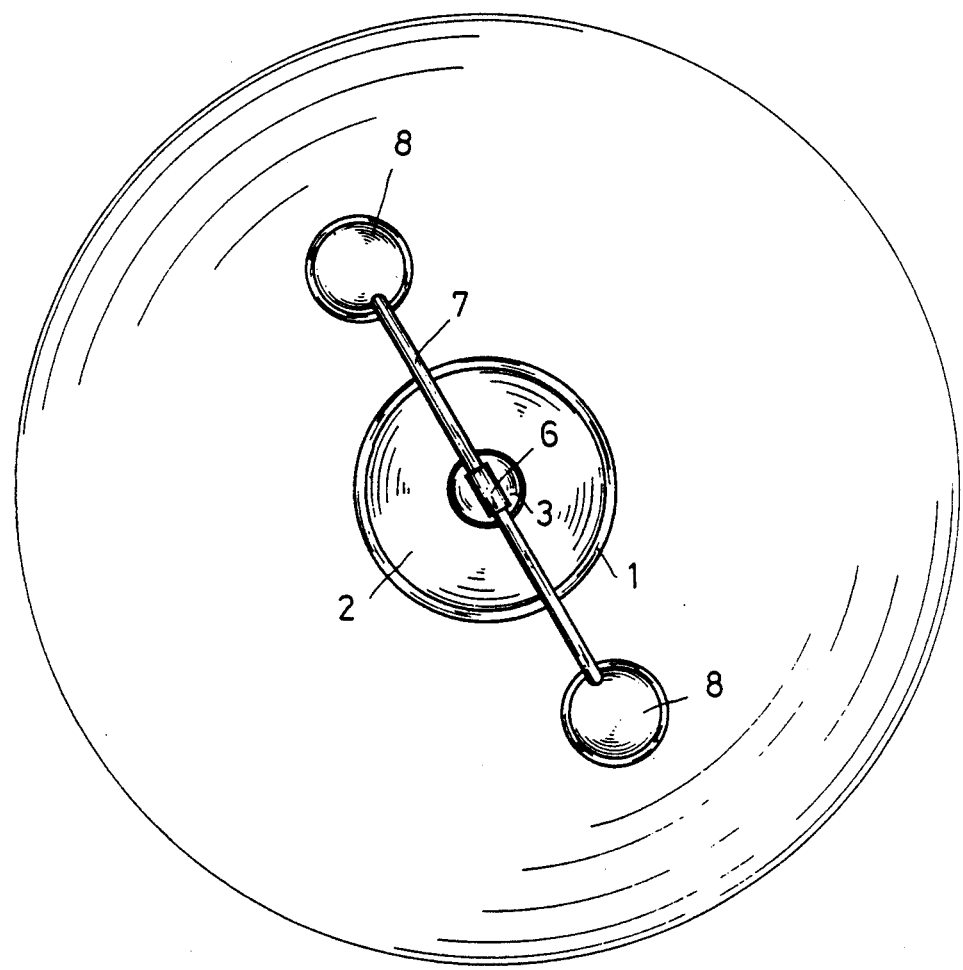
FIG. 4 illustrates a top view of the present invention upon being used.

The structure of this invention is illustrated with FIGS. 1 and FIG. 2, which mainly includes a cone-shaped stationary base (1), being made of a circular plate, and a cone-shaped reflective member (2), which is made of thin metal plate shaped into a hollow cone and fixed into its shape by two copper bars (9) clipping the metal plate tightly on both sides. The bottom of this cone-shaped reflective member is mounted on the low sinking neck (1a) of the base (1), and these two parts are glued or screwed tightly into one piece.

The top of the cone-shaped reflective member (2) is mounted with a rotary head supporting member (3), which has the same gradient as that of the cone-shaped reflective member (2), being used as a cover of the member. In the center of the top of the supporting member (3), there is a concave hole (4) which is slightly larger in size than the ball (5), but has a suitable tolerance to accept and to keep the ball of the rotary head (6) in place when it is forced into the concave hole (4), that is, the diameter of the opening of the hole (4) is slightly smaller than that of the ball (5).

The rotary head (6) and the ball shaped hollow portion (5) are molded into a single unit, that is, the rotary head and the ball are either produced with a same mold or produced by plastic injection machine. The rotary head (6) has a bow-shaped hollow portion (6a) which allows the bow-shaped hollow arm (7) to go through, so as to support the arm (7) and the lamp sockets (8). As the arm (7) is hollow in shape, its hollow interior (7a) accommodates electric wires (10). After the arm (7) and rotary head (6) are assembled together, they can turn 360 degrees horizontally.

The lamp sockets (8) of this invention includes lamp shades (8a) and lamp bulbs. The lamp shades (8a) are movably connected with the arm (7), that is, the ends of the arm (7) are connected with the axial holes (8b) of the lamp shades (8a) to allow the lamp shades (8a) to rotate freely in the axial holes (8b). As a result, the light projected by the lamp bulbs in straight line can be adjusted by a user, if necessary.

The preceding paragraphs have described the structure and principle of this invention, which is deemed a new and practical disclosure.

What is claimed as now is as following:

1. A desk lamp comprising a cone-shaped stationary base, a rotary head, and lamp housings disposed at opposite ends of a bow-shaped hollow arm which is attached to said rotary head, said cone-shaped stationary base further comprising a circular base member having a top portion smaller in diameter than a bottom portion which supports a cone-shaped reflective member made of a thin metal plate, a rotary head support member with a concave hole mounted on the top of said cone-shaped reflective member, said rotary head further comprising a ball-shaped hollow portion formed integrally with a bow-shaped hollow portion such that said bow-shaped hollow arm passes through said bow-shaped hollow portion and said ball-shaped hollow portion forms a ball and socket connection with said concave hole of said rotary head support member so that said bow-shaped hollow arm can rotate 360 degrees in the horizontal direction and pivot in the vertical direction with respect to said cone-shaped stationary base, electrical wires passing through said cone-shaped stationary base, said rotary head and said bow-shaped hollow arm to said lamp housings, said lamp housing being disposed on said bow-shaped hollow arm with respect to said cone-shaped stationary base such that a portion of the light from said lamp housings is reflected by said cone-shaped reflective member.

* * * * *